Jan. 25, 1966 A. W. KINGSBURY ETAL 3,231,091

SEPARATOR

Filed Oct. 29, 1962

United States Patent Office 3,231,091
Patented Jan. 25, 1966

3,231,091
SEPARATOR
Albert W. Kingsbury, Moorestown, N.J., and William S. Young, Newtown Square, Pa., assignors to Pfaudler Permutit, Inc., Birmingham, N.J., a corporation of New York
Filed Oct. 29, 1962, Ser. No. 233,821
2 Claims. (Cl. 210—335)

This invention relates to apparatus for separating oil from water, and more particularly to apparatus for separating viscous oil from ships' ballast water.

As the fuel oil tanks on sea going vessels become empty, they are customarily filled with sea water as ballast. The oil remaining in the tanks mixes with the sea water and is later discharged overboard during a deballasting operation prior to refueling. In order that seas and harbors not be contaminated with oil, it is desirable that the oil content of the ballast water be reduced before deballasting.

Many ships burn Bunker "C" fuel oil, which is difficult to separate from ballast water. Bunker "C" is the name commonly given to No. 6 fuel oil as defined by the Bureau of Standards in Commercial Standard CS 12–48. The specific gravity of Bunker "C" fuel oil is not constant and varies from about 0.93 to 1.06. Thus the Bunker "C" may be heavier, lighter or the same density as water and so is not consistently separable by gravimetric methods. In addition, density of the water itself may vary by reason of temperature variation or salinity differences.

Knitted metallic mesh fabric or fine mesh screens have been used for separating oils free from suspended matter from clear water. The fuel oil used in ships may contain residues, and in addition the water used for ballast purposes may be picked up from rivers in which the water contains dirt and other suspended particles. A major problem in the separation of oil from water by wire mesh screens has been the difficulty in cleaning the screens. A deficiency of the wire mesh screens has been that they are not satisfactory in coalescing high viscosity oils. Bunker "C" being a high viscosity oil, having a kinematic viscosity of between 45 and 300 seconds, Saybolt Furol, has not been separable by known coalescing methods on a practical basis.

Ideally, the screen material for use in separating oil from water has a low pressure drop, does not clog readily and is easily cleanable. Apparatus utilizing such screens desirably has means for continuously removing the oil collected from the screens.

It is an object of this invention to provide an apparatus for reducing the high viscosity oil content of oil-laden water.

It is a further object of this invention to provide an apparatus to continuously separate high viscosity oils from ships' ballast water, which apparatus is easily cleaned.

It is a further object of this invention to provide an apparatus to limit the residual oil being discharged in oil-laden ballast water to small size droplets which are widely dispersed, have less tendency to coalesce and are more susceptible to bacterial degradation in sea water than large droplets.

It is another object of this invention to provide a woven mesh screen which coalesces oil from oil-laden water, has a low pressure drop and is readily cleanable.

Other objects will be apparent to those skilled in the art from reading the following description taken in conjunction with the drawings in which.

The objects of this invention are achieved by passing a mixture of Bunker "C" oil and water through a series of open weave wire mesh screens. Surprisingly, the Bunker "C" oil is largely separated from the water by such operation. In passing through the screens, the oil coalesces and collects in a cohesive mass on the downstream side of the screen. The wire mesh screens are oleophilic in that they retain the oil on their surfaces. A simple draw-off device may be used to remove the coalesced oil from the screen continuously or intermittently. It has been discovered that by using relatively open weave mesh screens, sufficient coalescing action can be obtained to provide satisfactory removal of viscous oil from water. While the open mesh screens tend to clog, they are easily cleaned by a simple process of backwashing. The unexpected simplicity in cleaning is a feature of the invention.

Figure 1:
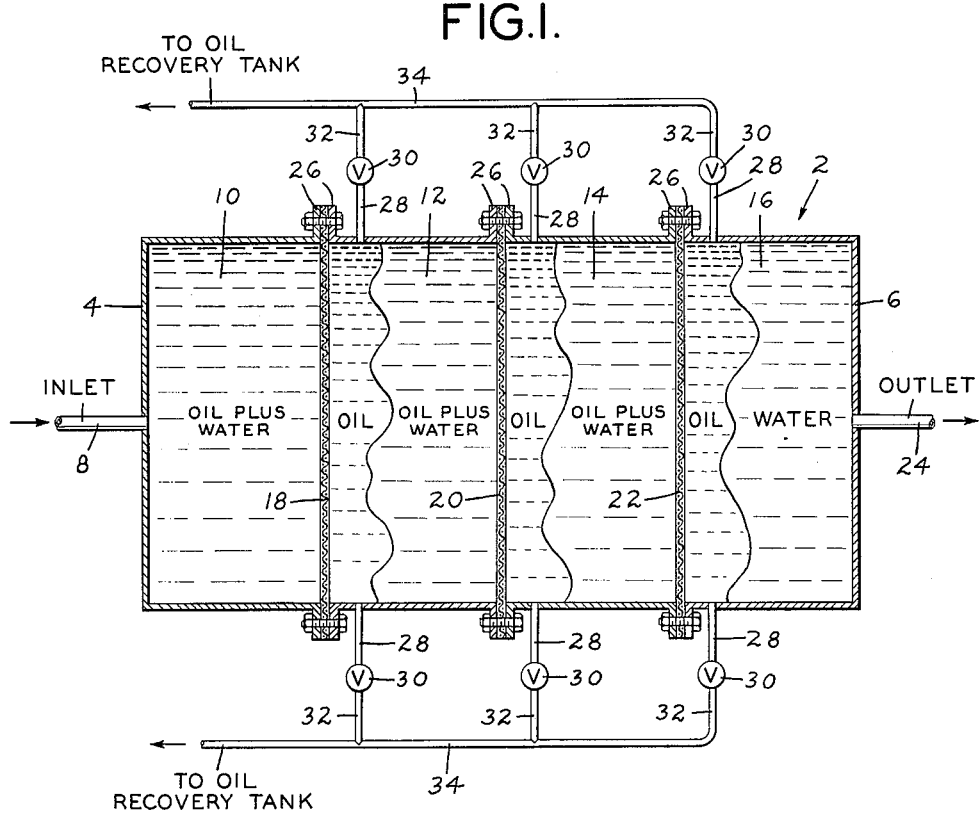
FIGURE 1 is a schematic view of one embodiment of the invention.

Turning now to FIGURE 1, there is a separator utilizing the principles of this invention. The separator consists of a shell 2, which is essentially cylindrical in shape, and contains heads 4 and 6 closing its ends. Head 4 contains an inlet conduit 8 through which oil-laden water is introduced. The shell is divided into chambers 10, 12, 14 and 16 by liquid pervious septa 18, 20 and 22.

Each septum extends across the separator shell intersecting the liquid flow path which extends from inlet 8 to outlet 24 in head 6. The septa may contain one or more open mesh screens and may be supported in the shell by any well known means, such as by flanges 26. Draw-off conduits 28 are mounted in the shell adjacent to the downstream face of each septum. Valves 30 control the flow from the draw-off conduits 28 through conduits 32 into the collection headers 34.

In operation, the oil-laden water enters chamber 10 of shell 2 through inlet 8 and passes through septum 18. A portion of the oil contained in the water is coalesced on the downstream face of septum 18. The slightly purified water passes across chamber 12 and through septum 20. Additional oil is coalesced on the downstream face of septum 20 and builds up in chamber 14. The additionally purified water passes across chamber 14 and through septum 22 where a final stage of oil coalesces on the face of septum 22. The purified water passes through chamber 16 and leaves the separator through outlet 24.

The oil which builds up on the downstream faces of the septa 18, 20 and 22 may be withdrawn through draw-off conduits 28. Valves 30 may be used to control the flow of oil so that the oil may be withdrawn continuously or intermittently. The withdrawn oil passes through conduits 32 into collection headers 34 and is discharged into an oil recovery tank, not shown.

Screen weaves which have been used with good results in the practice of this invention include, (1) plain weave, where each shute wire passes over and under successive rows of warp wire, and each warp wire passes over and under successive rows of shute wire; (2) twill, which is similar to the plain weave, except that each shute wire successively passes over and under two warp wires, and each warp wire successively passes over and under two shute wires; (3) plain Dutch weave, which has a similar interlacing as plain weave except that the warp wires are heavier and that the shute wires are lighter, and driven close together and crimped at each pass; and (4) twill Dutch weave, which is similar to Dutch weave, except that the warp wires are usually the same size as the shute wires.

Each screen of the septa used in the practice of this invention preferably has the same size opening, but the screens may have larger or smaller openings. Mesh designs in which the openings progressively decrease in size to a predetermined minimum size have been found easier to clean than other designs.

Figure 2:
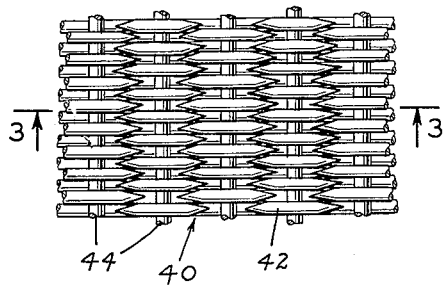
FIGURE 2 is a plan view of a Dutch weave wire mesh screen which may be used in the apparatus of this invention.
Figure 3:
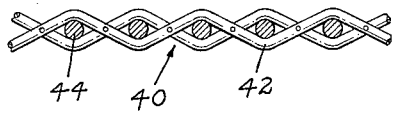
FIGURE 3 is a cross-sectional view of the wire mesh screen of FIGURE 2.

It has been found that Dutch weave wire mesh performs a satisfactory separation, has low pressure drop and is easily unclogged by backwashing. Dutch weave wire mesh is preferred for use in the practice of this invention. FIGURES 2 and 3 illustrate the Dutch weave wire mesh. Dutch weave wire mesh 40, is made up of shute wires 42 which pass over and under successive rows of warp wires 44; each warp wire 44 passes over and under successive rows of shute wires 42. In Dutch weave the warp wires 44 are heavier than the shute wires 42, and the shute wires 42 are driven up close to each other and then crimped at each pass. This construction results in a large number of tapered or wedge shaped openings. Each opening is formed by three space-related wire segments into an essentially triangular aperture. The tapered opening helps in preventing clogging and makes the wire mesh readily cleanable by backwashing.

Using Dutch weave septa good separation of oil from water is realized in extraordinarily high through-put rates. A rate of thirty gallons per minute per square foot of screen area has been achieved. It has been found that the thirty by one hundred fifty (30 x 150) Dutch weave wire mesh gives optimum results as to coalescence of the oil, pressure drop across the screen, and ready cleaning by backwashing. A 30 x 150 mesh screen has thirty openings to the inch in one direction and 150 openings to the inch in the other direction. A three inch diameter screen utilizing such material provides 0.053 square foot of surface area per screen. A 30 x 150 Dutch weave wire mesh passes a particle of 117 microns maximum size.

Three or four stages of coalescence have been found to be the maximum which are effective. Additional stages, beyond four, do not increase the amount of oil separated. The oil droplets contained in the water are so small after having passed four septa that they do not tend to coalesce on further screens.

The effluent from the separator of this invention consists of extremely small, highly dispersed particles of fuel oil in water. It is well known that if the droplet size of oil in water is reduced, coalescence of the droplets becomes more difficult. Furthermore, the rate of bacterial degradation of hydrocarbons increases with the reduction in droplet size. Finely dividing and highly dispersing oil in water that is to be discharged overboard hinders subsequent coalescence and promotes rapid bacterial decomposition of the hydrocarbon in the sea.

Surprisingly, it has been found that satisfactory separation with the apparatus of this invention occurs only with oils of high viscosity. While separations may be obtained where a viscous oil, like Bunker "C" is the contaminating oil, separation is not obtained where a less viscous oil, such as crude oil is the contaminating oil.

The separator of this invention will operate in either the vertical or horizontal position, or any variation between the two, the oil always being coalesced on the downstream side of the screen. In the design of the separator the inlets and outlets are preferably arranged so that heavier-than-water oils are moved upward through the separator and lighter-than-water oils are moved downward through the separator.

The separator of this invention was tested using three stages of coalescence at various flow rates and with various contamination concentrations of input water. The screens used as septa were varied both in size and in number. It was established that separation efficiency is insensitive to flow rate between 10 and 30 gallons per minute per square foot of screen area. The results of the tests are shown in Table I below. Where two sizes appear under a screen number, it is to be understood that two screens adjacent to one another were used as a single septum. It has been found that the oil concentration in the effluent water may be reduced by using as a septum at one stage, preferably the second or third stage, a double metal sheet with offset perforations. Such a septum, used alone, tends to clog and is difficult to clean. When used in conjunction with the more open mesh screen of the type of this invention as a pre-filter, such a septum is less susceptible to clogging and permits reduction in the oil content of the effluent water. An example of a suitable double metal sheet with offset perforations is the filter sold under the trademark Nevaclog by Multi-Metal Wire Cloth Co., Inc. of New York City.

In Table I the following designations are used for screens:

20 _____ 20 mesh plain weave.
24 x 110 _____ 24 x 110 mesh Dutch weave.
30 x 150 _____ 30 x 150 mesh Dutch weave.
20 x 150 _____ 20 x 150 mesh Dutch weave.
12 x 64 _____ 12 x 64 mesh Dutch weave.

TABLE I

*Oil separation data*

| Screens | | | Flow rate, g.p.m./ft.² screen area | Head loss, p.s.i. | Oil, p.p.m. | | Percent Removal |
|---|---|---|---|---|---|---|---|
| 1 | 2 | 3 | | | Influent | Effluent | |
| 24 x 110 | 24 x 110 | 24 x 110 | 10 | 2.5 | 480 | 109 | 77.3 |
| | | | 10 | 2.5 | 2,540 | 241 | 90.5 |
| | | | 11.5 | 2.5 | 1,861 | 336 | 81.9 |
| | | | 12.5 | 1.7 | 1,970 | 358 | 81.0 |
| | | | 20 | 2.7 | 588 | 188 | 68.0 |
| | | | 20 | 2.7 | 1,535 | 328 | 78.6 |
| | | | 20 | 3.0 | 2,540 | 285 | 88.8 |
| | | | 30 | 5.7 | 2,540 | 281 | 88.9 |
| 30 x 150 | 30 x 150 | 30 x 150 | 10 | 1.0 | 1,235 | 166 | 86.6 |
| | | | 10 | 1.0 | 2,035 | 258 | 87.3 |
| | | | 10 | 4.0 | 6,130 | 122 | 98.0 |
| | | | 10 | 4.5 | 15,800 | 204 | 98.7 |
| | | | 20 | 2.7 | 442 | 105 | 76.2 |
| | | | 20 | 2.9 | 1,300 | 160 | 87.7 |
| | | | 20 | 2.7 | 2,258 | 206 | 90.9 |
| | | | 20 | 3.2 | 2,600 | 637 | 75.5 |
| | | | 30 | 4.7 | 1,238 | 168 | 86.3 |
| | | | 30 | 4.5 | 1,313 | 317 | 76.0 |
| 20 | 24 x 110 | 20 | 15 | 2.7 | 455 | 390 | 14.2 |
| | | | 20 | 2.0 | 1,980 | 450 | 77.3 |
| 24 x 110 | 24 x 110 (2) | 24 x 110 (2) | 10 | 1.5 | 3,450 | 124 | 96.4 |
| | | | 20 | 2.7 | 3,605 | 283 | 92.1 |
| | | | 30 | 5.2 | 2,685 | 197 | 92.7 |
| 20 x 150 | 20 x 150 | 20 x 150 | 10 | 1.0 | 4,610 | 1,430 | 65.6 |
| | | | 20 | 2.7 | 4,900 | 1,220 | 75.0 |
| | | | 30 | 4.5 | 3,610 | 1,450 | 59.8 |
| 12 x 64 | 12 x 64 | 12 x 64 | 10 | 0.9 | 1,510 | 1,290 | 14.5 |
| | | | 20 | 2.1 | 3,200 | 1,490 | 53.4 |
| | | | 30 | 5.1 | 2,290 | 2,110 | 7.8 |

TABLE I—Continued

| Screens | | | Flow rate, g.p.m./ft² screen area | Head loss, p.s.i. | Oil, p.p.m. | | Percent Removal |
| --- | --- | --- | --- | --- | --- | --- | --- |
| 1 | 2 | 3 | | | Influent | Effluent | |
| 24 x 110 | 24 x 110 | 20 x 150 | | | | | |
| | 20 x 150 | 20 x 150 | 10 | 1.8 | 3,540 | 111 | 96.9 |
| | | | 20 | 3.3 | 692 | 102 | 85.3 |
| | | | 30 | 6.0 | 1,680 | 592 | 64.6 |
| 24 x 110 | 20 x 150 | 20 x 150 | | | | | |
| | 20 x 150 | Nevaclog | 10 | 1.5 | 2,660 | 74 | 97.2 |
| | | | 20 | 3.2 | 2,590 | 52 | 98.0 |
| | | | 30 | 6.5 | 3,005 | 87 | 97.1 |
| 24 x 110 | Nevaclog | 24 x 110 | 10 | 1.3 | 614 | 84 | 86.3 |
| | | | 20 | 2.9 | 685 | 67 | 90.1 |
| 30 x 150 | 30 x 150 | 24 x 110 | | | | | |
| 30 x 150 | 24 x 110 | 24 x 110 | 10 | 1.5 | 1,085 | 111 | 89.8 |
| | | | 20 | 2.7 | 991 | 123 | 87.6 |
| | | | 20 | 5.0 | 4,670 | 154 | 96.7 |
| | | | 30 | 4.5 | 807 | 101 | 87.5 |

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. Apparatus for separating from water liquid hydrocarbons having a kinematic viscosity of between about 45 and 300 seconds, Saybolt Furol, comprising an essentially cylindrical shell, an inlet at one end of said shell, an outlet at the other end of said shell, a plurality of septa, each septum comprising a single spaced plain Dutch weave wire mesh screen disposed within said shell between said inlet and outlet and adapted progressively to coalesce said liquid hydrocarbon as the water passes through said shell, each of said screens having about 20 to 30 wires per inch in one direction and about 110 to 150 wires per inch in the other direction, and draw-off means mounted in said shell adjacent to said screens to continuously withdraw said coalesced hydrocarbons.

2. Apparatus for separating large droplets of contaminating viscous oil for ships' ballast water comprising a shell forming a flow path for the oil-laden water, a plurality of liquid pervious septa, each septum comprising a single plain Dutch weave screen disposed within said shell in spaced relation to each other and dividing said shell into successive chambers, each of said screens having from about 20 to 30 strands per inch in one dimension and from about 110 to 150 strands per inch in the other dimension, and draw-off means mounted in said shell adjacent to said screens to continuously withdraw said viscous oil, whereby droplets of viscous oil greater than a predetermined size are removed from said water, and the remaining particles have less tendency to coalesce and are more susceptible to bacterial degradation when discharged into the open sea than the larger droplets.

References Cited by the Examiner
UNITED STATES PATENTS

| | | | |
| --- | --- | --- | --- |
| 953,377 | 3/1910 | Copeland | 210—335 X |
| 1,107,485 | 8/1914 | Bowser. | |
| 1,470,719 | 10/1923 | Gannon | 210—301 |
| 1,661,284 | 3/1928 | Fuqua et al. | 210—301 X |
| 1,665,164 | 4/1928 | Gard et al. | 210—301 |
| 2,271,662 | 2/1942 | Rubissow | 210—499 X |
| 2,405,838 | 8/1946 | Lawson et al. | |
| 2,423,547 | 7/1947 | Behlen | 210—499 |
| 2,432,317 | 12/1947 | Lawson et al. | 210—300 X |
| 2,651,414 | 9/1953 | Lawson. | |
| 2,746,607 | 5/1956 | Hess. | |
| 2,763,372 | 9/1956 | Dudchik | 210—23 X |
| 2,775,550 | 12/1956 | Harlow | 210—499 X |

REUBEN FRIEDMAN, *Primary Examiner.*

HARRY B. THORNTON, HERBERT L. MARTIN,
*Examiners.*